United States Patent [19]

Kiriyama et al.

[11] Patent Number: 5,703,645
[45] Date of Patent: Dec. 30, 1997

[54] VIDEO SIGNAL TRANSMITTING APPARATUS

[75] Inventors: Norio Kiriyama; Hirobumi Yokosuka, both of Hitachi, Japan

[73] Assignee: Hitachi, Ltd., Tokyo, Japan

[21] Appl. No.: 574,771

[22] Filed: Aug. 30, 1990

[30] Foreign Application Priority Data

Sep. 16, 1989 [JP] Japan .................. 1-240320

[51] Int. Cl.$^6$ .............................. H04N 7/12; H04N 11/02
[52] U.S. Cl. ............................................. 348/388; 375/260
[58] Field of Search .................... 358/160, 133, 358/134, 23, 22, 142, 12, 141, 11, 21 R; 360/22, 140, 23, 24; 370/112, 69.1, 38; 375/26, 27, 28, 29, 30, 122, 35, 37, 59, 39, 61, 38, 48, 58; 455/59; 328/17, 30, 62, 103, 104, 105, 140, 153; 307/260, 271; 348/387–399; H04N 5/14, 7/12, 11/02

[56] References Cited

U.S. PATENT DOCUMENTS

| | | | |
|---|---|---|---|
| 3,188,648 | 6/1965 | Cecil | 360/23 |
| 3,281,806 | 10/1966 | Lawance et al. | 375/260 |
| 3,311,757 | 3/1967 | Matsumoto | 328/106 |
| 3,414,677 | 12/1968 | Quinlan | 358/133 |
| 3,499,108 | 3/1970 | Simon | 358/160 |
| 3,522,537 | 8/1970 | Boughtwood | 375/39 |
| 3,553,080 | 1/1971 | Hammond | 360/22 |
| 3,739,083 | 6/1973 | Leiboff et al. | 358/133 |
| 3,809,809 | 5/1974 | Kasprzak | 348/388 |
| 4,491,861 | 1/1985 | Sochor | 348/388 |
| 4,533,964 | 8/1985 | Owaki et al. | 360/22 |
| 4,641,318 | 2/1987 | Addeo | 375/38 |
| 4,668,985 | 5/1987 | Kurashige et al. | 358/134 |
| 4,727,361 | 2/1988 | Tokumitsu | 358/23 |
| 5,019,919 | 5/1991 | Nagashima | 360/22 |
| 5,208,804 | 5/1993 | Wilson et al. | 375/260 |

FOREIGN PATENT DOCUMENTS 61-23379  10/1986  Japan .

*Primary Examiner*—Michael H. Lee
*Attorney, Agent, or Firm*—Antonelli, Terry, Stout & Kraus, LLP.

[57] ABSTRACT

A video signal is encoded to a plurality of signals and each of the encoded analog video signals is regenerated as the video signal. The regenerated video signal is outputted to a CRT display, and each of the plurality of encoded signals is transmitted by using only two, predetermined analog values to represent all logic levels corresponding to each of the encoded signals. The video signal regenerating section is constituted by an integral circuit arrangement for adding the analog amounts of each of the transmitted signals and for restoring the video signal. The video signal can be restored from the analog values transmitted through an addition calculating processing of each of the transmitted signals.

9 Claims, 5 Drawing Sheets

VIDEO SIGNAL TRANSMITTING APPARATUS

BACKGROUND OF THE INVENTION

The present invention relates to a video signal transmitting apparatus and, more particularly, to a video signal transmitting apparatus in which the video signal is converted to a plurality of signals and the converted plurality of signals are transmitted to a CRT display apparatus.

The video signal is encoded in the video signal encoding section. The encoded video signal is transmitted to the video signal regenerating section either through the analog converting section or directly (i.e., without going through the analog converting section). The converted signal is outputted, in the form of a logic level, from the video signal regenerating section and is applied to a CRT display apparatus. The converted signal supplied to the CRT display apparatus is characterized by a different frequency component than that of the video signal. The frequency component of each converted signal has a lower value than that of the video signal.

Recently, in compliance with the demands for a high precision picture image of a CRT display apparatus, it has thus been required to make higher the frequency component itself of the video signal, which is supplied to CRT display apparatus through the video signal transmitting apparatus.

For the above stated reasons, in the video signal transmitting system in which the video signal alone, without the converted signal, is supplied to a CRT display apparatus, it becomes necessary to enhance the operating speed in the electric circuit for transmitting the video signal and also effect countermeasures of unnecessary (undesirable) radiation in the signal transmitting passage. The unnecessary radiation in the electric circuit of the video signal transmitting apparatus may the readily generated in the case of a high frequency component, however the radiation must not be generated intrinsically. Accordingly, three arises difficulties in the design of the electric circuit of the video signal transmitting apparatus.

As a method for solving the above stated problems, there has been known a video signal transmitting method in which the video signal is first converted to a plurality of signals and the converted signals are transmitted to a CRT display apparatus.

As a technique for converting the video signal to a plurality of signals (n signals) in the video signal transmitting apparatus, a serial-parallel video signal converting method has been employed generally as shown, for example, in Japanese Patent Laid-Open No. 233779/1986. In this video signal converting method, the frequency component of each of the converted signals (n signals) is lowered to a frequency of less 1/n that of the frequency component of the video signal. Accordingly, it becomes easy to effect countermeasures for unnecessary (undesirable) radiation generated in the electric circuit and during the signal transmission passage for transmitting video signal.

However, in the above stated prior video signal transmitting method, it also becomes necessary to restore the video signal in the CRT display apparatus. In this method, since the conversion for the video signal is carried out by employing the logic method, it is necessary to realize the restoring of the video signal by implementing a logic circuit.

For example, in the serial-parallel video signal converting method in the video signal transmitting apparatus shown in the above stated Japanese Patent Laid-Open No. 233779/1986, it is necessary for the serial-parallel video signal converting circuit to use a shift resistor and a high-speed phase clock generating circuit for operating the serial-parallel video signal converting circuit in a CRT display apparatus.

This digital display apparatus comprises a control unit for producing the digital signal for displaying and a display unit for displaying the digital signal on a CRT display apparatus. The display unit in the digital display apparatus employs analog circuits and logic circuits. The analog circuits in the display unit comprise the deflecting circuit and the video circuit. The logic circuits in the display unit comprise the serial-parallel video signal converting circuit and the clock generator.

Besides, in the CRT display apparatus described above, the video signal is treated as being of an analog signal form. As a result, each of the electric circuits for constituting the CRT display apparatus comprises analog circuits for handling the analog signals. For the inclusion of the analog circuits and the logic circuits, not only do the circuit hardware requirements become complicated, but also problems in the design thereof develop. The problems that develop in the design are, for example, as a result of the signal interface design between that of the analog circuits and the logic signals and also with respect to implementing countermeasures for the radiation noise being generated in the logic circuits.

Further, in the above-stated serial-parallel video signal converting method, the signal supplied to the CRT display apparatus is in a digital signal form. Namely, in this digital display apparatus, the parallel data digital signal from the control unit is inputted to the serial-parallel video signal converting circuit comprising the logic circuit and also the character clock digital signal from the control unit is inputted to the clock generator comprising the logic circuit, respectively.

Since the amplitude becomes large and the reflection in the signal transmitting passage is great in such a digital signal, unnecessary (undesired) radiation in the signal transmitting passage becomes significantly large when the digital signal is transmitted.

In order to solve the above stated problems in connection with such an apparatus, the following method may be considered, in the other words, the digital signal is converted to that of an analog signal form and the converted analog signal is transmitted to a CRT display apparatus, and the analog signal is returned again to the digital signal form in the CRT display apparatus.

However, in such a video signal converting method, it becomes necessary to have the signal converting circuit for converting the analog signal to the digital signal in the signal supply apparatus and further it becomes necessary to have the signal conversion circuit for converting the digital signal to the analog signal in the CRT display apparatus. Accordingly, the hardware requirement therefor become complicated.

SUMMARY OF THE INVENTION

An object of the present invention is to provide a video signal transmitting apparatus wherein the video signal can be restored according to an analog signal processing.

Another object of the present invention is to provide a video signal transmitting apparatus wherein the video signal can be regenerated according to a difference in the analog amounts of the analog signals.

A further object of the present invention is to provide a video signal transmitting apparatus wherein the video signal can be restored according to the analog amounts of the analog signals corresponding to the logic levels.

A further object of the present invention is to provide a video signal transmitting apparatus wherein the video signal can be restored according to the addition of each of the analog amounts of the analog signals corresponding to the logic levels.

A further object of the present invention is to provide a video signal transmitting apparatus wherein the unnecessary (undesirable) radiation in the electric circuit for transmitting the video signal can be avoided.

A further object of the present invention is to provide a video signal transmitting apparatus wherein the signal transfer operating speed in the signal transmitting passage of the electric circuit for transmitting the video signal can be made higher.

In accordance with a video signal transmitting apparatus of the present invention in which a video signal is outputted in the form of with a logic level, the video signal is converted to a plurality of signals and the plurality of converted signals are transmitted to a display apparatus, and the frequency component corresponding to each of the plurality of converted signals is lowered, the improvement in the video signal transmitting apparatus comprising a signal transmitting means for transmitting each of the plurality of converted signals using two analog amounts (for example voltage values) to represent the logic levels corresponding to the plurality of converted signals, and regenerating means, coupled to the signal transmitting means, for adding the analog amounts of each of the transmitted signals and for restoring the video signal from the analog values.

In accordance with a video signal transmitting apparatus in the present invention comprising a video signal encoding section in which a video signal is outputted in a logic level form, the video signal being encoded into that of a plurality of signals, an analog converting section in which each of the plurality of encoded signals is converted to an encoded analog video signal, and a video signal regenerating section in which each of the encoded analog video signals is regenerated (for example, restored) as the video signal, the regenerated video signal is outputted to a CRT display apparatus, each of the plurality of encoded signals is transmitted by using two analog amounts to logic levels corresponding to each of the plurality of encoded signals, and the video signal regenerating section comprises regenerating means for adding the analog amounts of each of the transmitted signals and for restoring the video signal from the analog values.

In accordance with a video signal transmitting apparatus in the present invention comprising a video signal encoding section in which a video signal is outputted in a logic level form, the video signal being encoded to a plurality of signals, and a video signal regenerating section in which each of the encoded analog video signals is regenerated as the video signal, the regenerated video signal is outputted to a CRT display apparatus, each of the plurality of encoded signals is transmitted by using two analog amounts to represent logic levels corresponding to each of the plurality of encoded signals, and the video signal regenerating section comprises regenerating means for adding the analog amounts of each of the transmitted signals and for restoring the video signal from the analog values.

In the video signal transmitting apparatus according to the present invention, the video signal which is outputted as a logic level is converted to n signals. In considering the conversion of the video signal to n signals, in the case where the video signal is at the level "0", the number of the converted signals corresponding to this level is equal to the number "m1", and in the case where the video signal is "1", the number of the converted signals in which the logic levels thereof become logic level "1" corresponds to the number "m2".

Accordingly, each of the converted signals is transmitted using two analog amounts corresponding to the logic level of the video signal, and the video signal can be restored through the addition calculating processing of each of the transmitted signals.

In the present invention, the analog amount can be set to a value="a1", in the case of the logic level being at logic "1", and the analog amount can be set to a value="a2", in the case of the logic level being at logic "0".

The total sum of the analog amounts corresponding to the logic levels representing n signals becomes a1×m1+a2×(n−m1), in which the number of converted signal at the logic level "1" is equal to "m1". The total sum of the analog amounts corresponding to the logic levels representing n signals becomes a1×m2+a2×(n−m2), in which the number of converted signals at the logic level "1" is "m2". As stated above, in the present invention, the total sum of the analog amounts corresponding to the logic levels in n signals has different value, respectively.

Accordingly, on the occasion of the conversion of the video signal to n signals, in a case that the video signal is at the level "0" the number of signals being at the logic level "1" are represented by the number "m1", and in a case that the video signal is at the level "1" the number of signals being at the logic level "1" are represented by the number "m2". As a result, the logic level of the video signal is converted to an analog having two analog amounts, a first amount or value corresponding to the video signal logic level "1" and a second amount or value corresponding to the video signal "0". The analog signal having two analog amounts corresponding to the video signals can be defined as an analog video signal.

Therefore, in the present invention, the video signal can be restored in accordance with voltage the difference resulting from two analog amounts of the analog video signal.

DESCRIPTION OF THE INVENTION

One embodiment of a video signal transmitting apparatus according to the present invention will be explained referring to the accompanying drawings.

Figure 1:
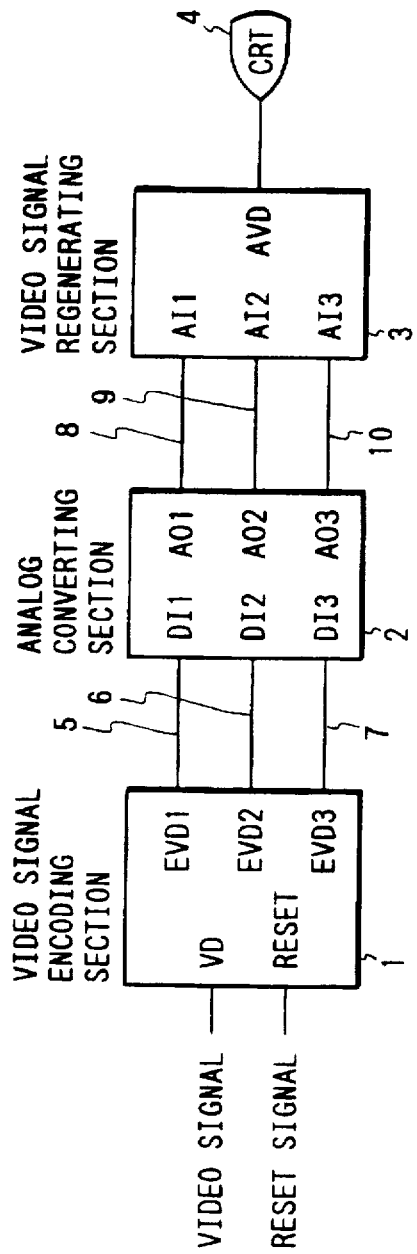
FIG. 1 is a block diagram showing one embodiment of a video signal transmitting apparatus according to the present invention.

FIG. 1 is a block diagram showing a video signal transmitting apparatus according to the present invention. A video signal transmitting apparatus comprises a video signal encoding section 1, an analog converting section 2, a video signal regenerating section 3, digital signal transmitting lines 5, 6 and 7, and analog signal transmitting lines 8, 9 and 10. The video signal regenerating section 3 of the video signal transmitting apparatus is connected electrically to CRT display apparatus 4.

The video signal encoding section 1 inputs the video signal from an input terminal VD and encodes the video signal. The video signal encoding section 1 outputs the encoded video signal to output terminals EVD1, EVD2 and EVD3 showing the encoded video signals (for example, binary encoded signals. The video signal encoding section 1 can be initialized upon receiving a reset signal at an input terminal RESET thereof.

The encoded video signal from the video signal encoding section 1 is transmitted to the analog converting section 2 via the digital signal transmitting lines 5, 6 and 7. The analog converting section 2 receives the encoded video signal at input terminals DI1, DI2 and DI3 thereof and generated at the output terminals AO1, AO2 and AO3 thereof the encoded analog video signal which is converted to have a particular analog amount corresponding to the digital signal "0" or "1".

The encoded analog video signal outputted from the analog converting section 2 is sent to the video signal regenerating section 3 via the analog signal transmitting lines 8, 9 and 10. The video signal regenerating section 3 operates on the encoded analog video signal received at input terminals AI1, AI2 and AI3 regenerate the analog video signal. The regenerated analog video signal is transmitted via an output terminal AVD thereof to the CRT display apparatus 4.

Figure 2:
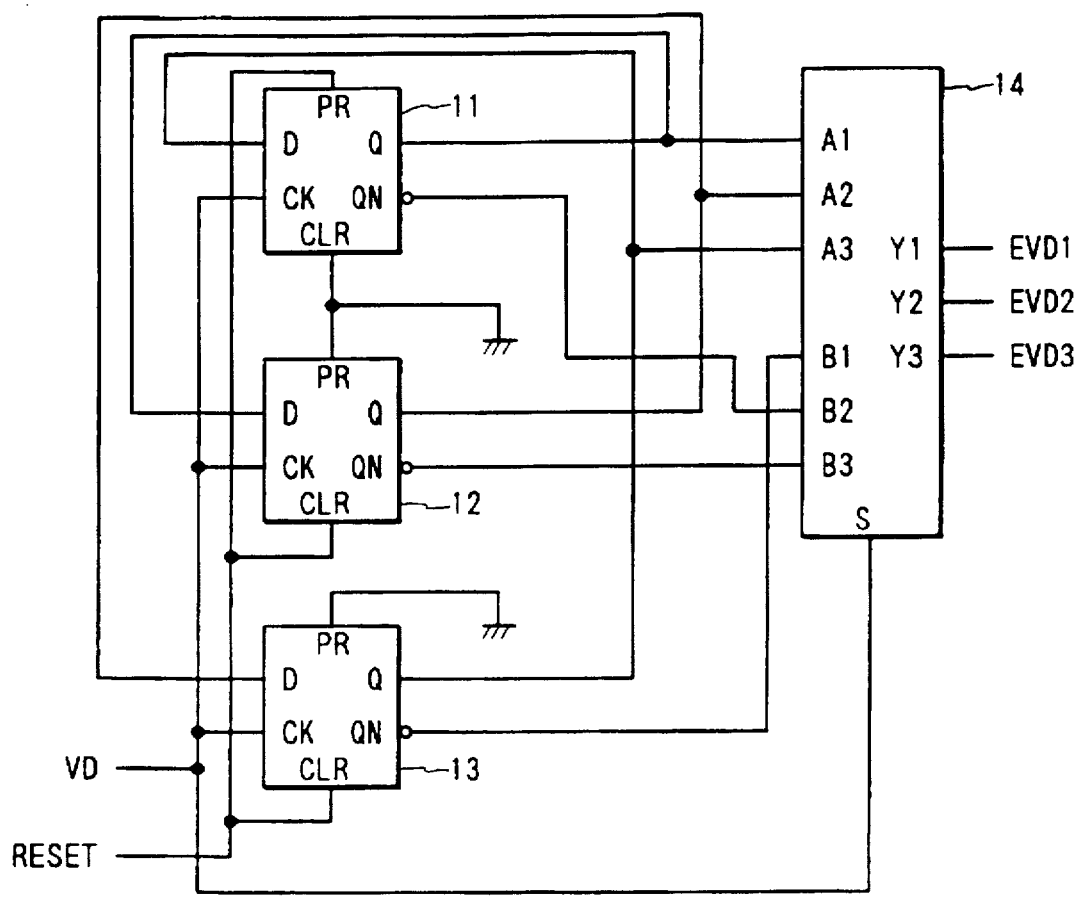
FIG. 2 is a block diagram showing a video signal encoding section of the video signal transmitting apparatus.

Next, the constitution of the video signal encoding section 1 will be explained referring to the drawings. As shown in FIG. 2, the video signal encoding section 1 comprises three D-flip-flop circuits 11, 12 and 13, and a selector 14. Each of D-flip-flop circuits 11, 12 and 13 samples an input terminal D by rise (i.e., a low-to-high level change) of an input terminal CK representing a clock and in response there to the input terminal D is outputted to an output terminal Q. An output terminal QN is an inversion output of the output terminal Q.

At the D-flip-flop circuits 11, 12 and 13, in case that the present signal PR is "1", then the output terminals Q and QN become Q="1" and QN="0", respectively. Further, in case that the clear signal CLR is "1", then output terminals Q and QN become Q="0" and QN="1", respectively.

At the selector 14, in the case where the input terminal S is at logic level "0", the selector 14 provides the signal levels at input terminals A1, A2 and A3 at output terminals Y1, Y2 and Y3, respectively. Further, in the case where the input terminal S is at logic "1", the selector 14 provides the signal levels at input terminals B1, B2 and B3 at the output terminals Y1, Y2 and Y3, respectively.

Three D-flip-flop circuits 11, 12 and 13 constitute a ring counter which operates by the rise of the video signal VD. Each of the outputs at Q of the D-flip-flop circuits 11, 12 and 13 is supplied to the input terminals A1, A2 and A3 of the selector 14, respectively.

The output of the ring counter is shifted with one (1) bit part and the inverted outputs thereof are inputted to the input terminals B1, B2 and B3 of the selector 14, respectively. The video signal VD is inputted to the input terminal S of the selector 14. Each of the output terminals Y1, Y2 and Y3 of the selector 14 becomes the encoded video signal showing the encoded video signals EVD1, EVD2 and EVD3, respectively.

Figure 3:
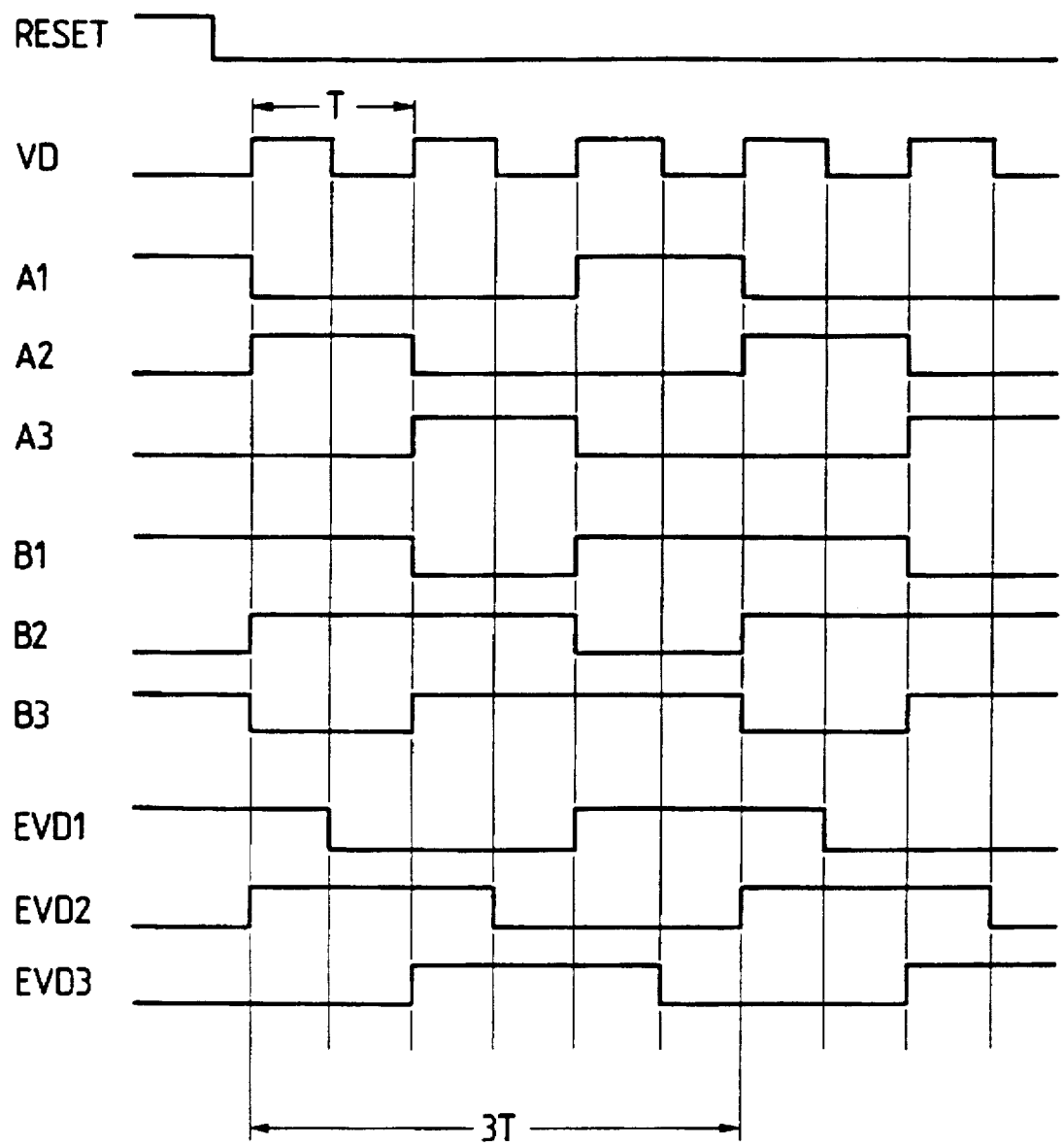
FIG. 3 is a timing chart showing input/output relationship pertaining to the video signal encoding section.

FIG. 3 is a timing chart showing the operation of the video signal encoding section 1. In FIG. 3, VD indicates the video signal, A1, A2 and A3 indicate the input terminals of the selector 14, B1, B2 and B3 indicate the other group of input terminals of the selector 14, and EVD1, EVD2 and EVD3 indicate the encoded video signals, respectively.

The video signal encoding section 1 is initialized when the reset signal RESET is set "1", at logic level wherein the input and output terminals become A1=B1=B3="1" and A2=A3=B2="0". The video signal VD is encoded according to the output of the ring counter constituting three D-flip-flop circuits 11, 12 and 13. Such D-flip-flop circuits 11, 12 and 13 are shifted at every occurrence a of rise in level the video signal VD.

When the period of the video signal VD is set at "T", then the period of each of the encoded video signals EVD1, EVD2 and EVD3 equals "3T". Namely, each of the encoded video signals EVD1, EVD2 and EVD3 is characterized with respect to its frequency component as being that ⅓ compared with the frequency of the video signal VD.

In case that the video signal VD is at level "0", only one signal of the encoded video signals EVD1, EVD2 and EVD3 becomes "1". However, in case that the video signal VD is at level "1", two signals of the encoded video signals EVD1, EVD2 and EVD3 are set at logic level "1".

As shown in the above stated example, the video signal encoding section 1 in the present invention is expressed in accordance with the number of signals being at the logic level "1" within the encoded video signals EVD1, EVD2 and EVD3. Each signal of the encoded video signals EVD1, EVD2 and EVD3 encoded from the video signal VD is expressed as a logic level "0" or "1".

Figure 4A:
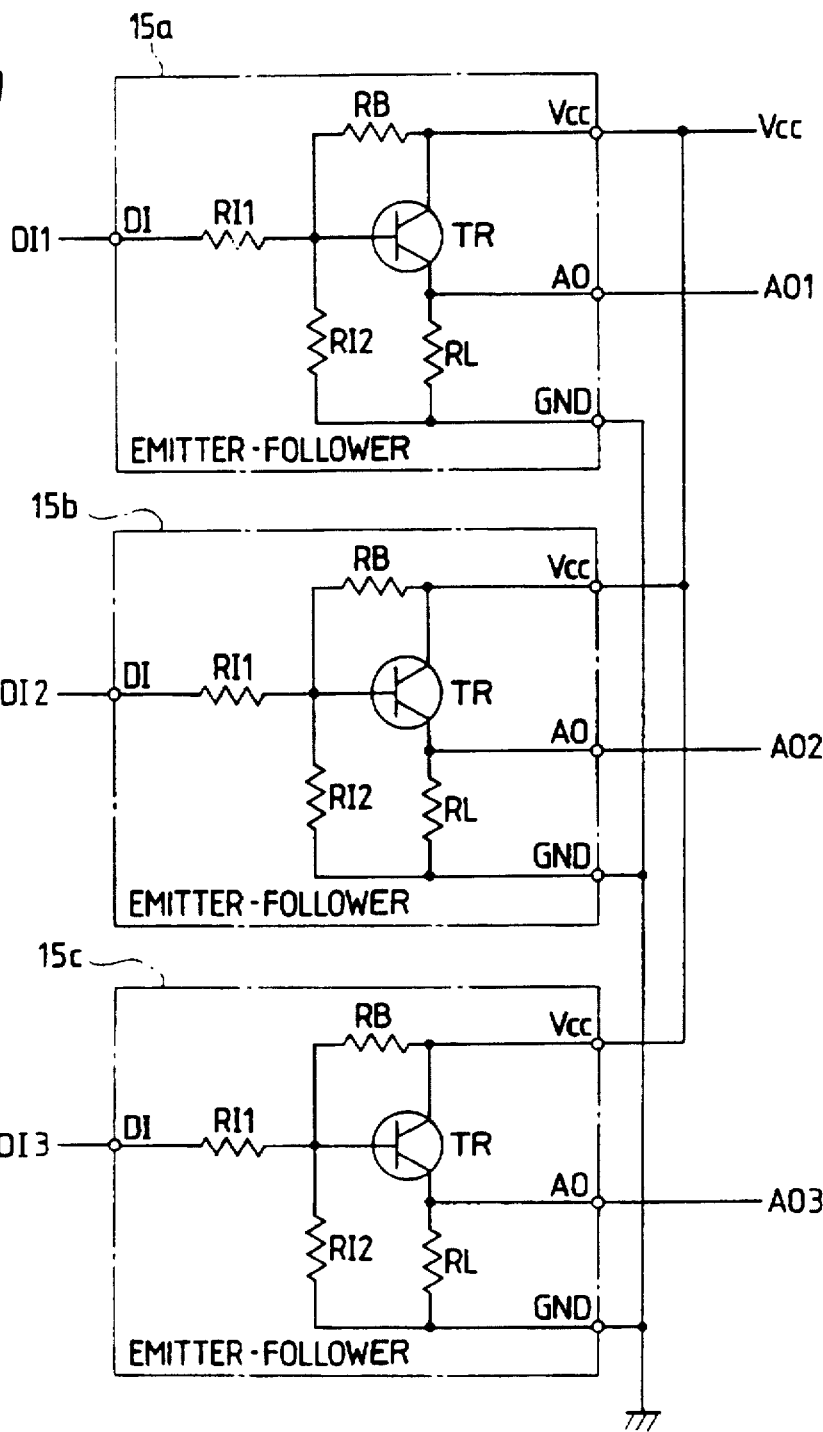
FIG. 4(a) is a block diagram showing an analog converting section of the video signal transmitting apparatus.

FIG. 4(a) shows a constitution of the analog converting section 2. As shown in this FIG. 4(a), the analog converting section 2 comprises emitter-followers 15a, 15b and 15c. Each of the emitter-followers 15a, 15b and 15c comprises a transistor TR, resistors RI1 and RI2, and resistors RB and RL.

Figure 4B:
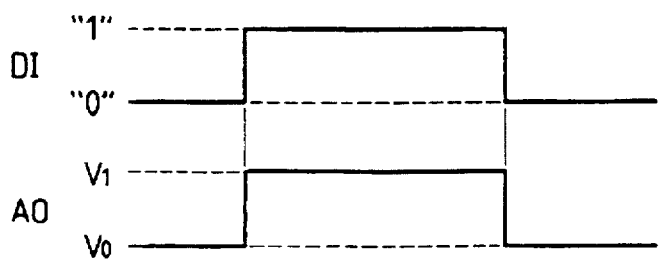
FIG. 4(b) is a timing chart showing an example of an input/output signal operation relationship of the analog converting section.

The encoded video signals EVD1, EVD2 and EVD3 are converted to the encoded analog video signals AO1, AO2 and AO3. As shown in FIG. 4(b), each of the encoded analog video signals AO1, AO2 and AO3 outputs the voltage of "$V_0$" or the voltage of "$V_1$". ($V_0 < V_1$) corresponding to the digital signal "0" or "1", respectively, which is inputted to the input terminals DI1, DI2 and DI3.

Figure 5A:
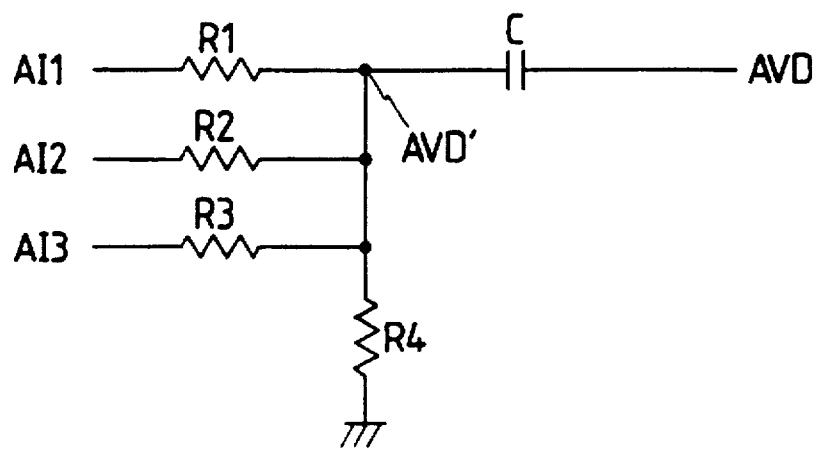
FIG. 5(a) is a block diagram showing a video signal regenerating section of the video signal transmitting apparatus.

FIG. 5(a) shows a constitution of the video signal regenerating section 3. The video signal regenerating section 3 comprises resistors R1, R2, R3 and R4 and a capacitor C. Each of the resistors R1, R2 and R3 has an equal value (R1=R2=R3).

Figure 5B:
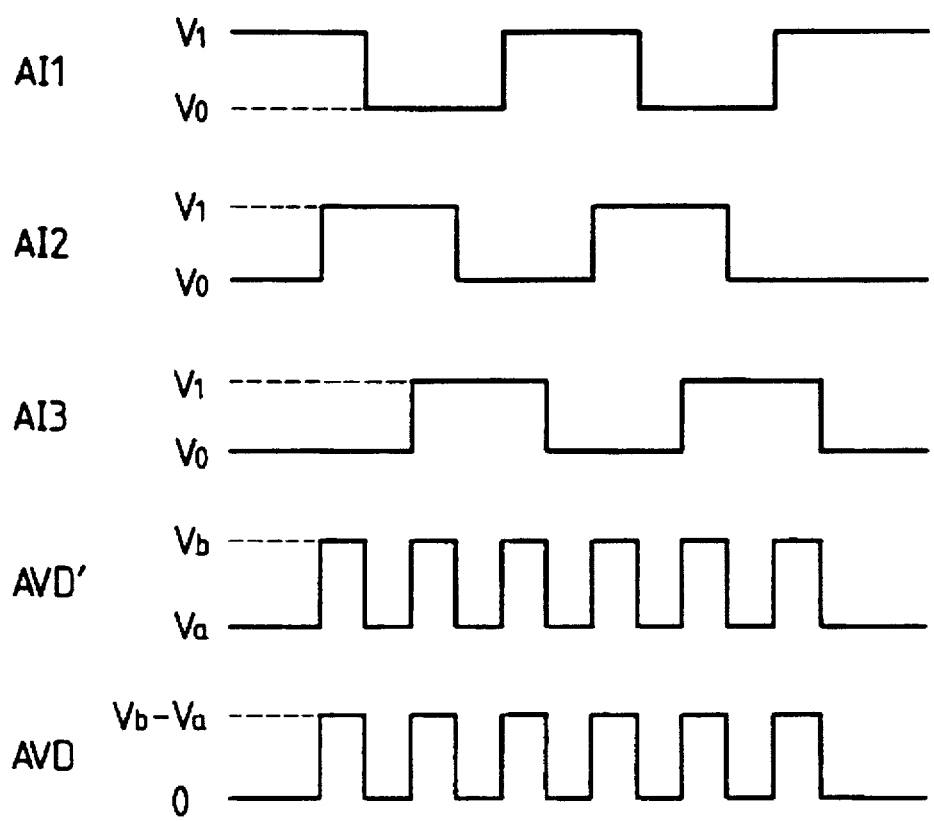
FIG. 5(b) is a motion timing chart showing signal relationships in the video signal regenerating section.

The resistors R1, R2, R3 and R4 together constitute an addition circuit for the encoded analog video signals AO1, AO2 and AO3. As shown in FIG. 5(b), within the encoded analog video signals AO1, AO2 and AO3, in the case wherein only one signal of the encoded analog video signals AO1, AO2 and AO3 is at the voltage level of $V_1$ and the residual two signals are at the voltage levels of $V_0$, the output terminal AVD' provides a voltage of a level $V_a$. However, within the encoded analog video signals AO1, AO2 and AO3, in the case wherein the voltages of two signals of the encoded analog video signals are at the level $V_1$ and the residual one of the signals AO1, AO2 and AO3 is at the level $V_0$, the voltage of the output terminal AVD' provides a the voltage of a level $V_b$ rising from the voltage of $V_a (V_a < V_b)$.

As a result, the output terminal AVD' includes the video signal component having an amplitude of $(V_b - V_a)$. Only the video signal component is extracted by the capacitor C and this extracted video signal component is outputted to the output terminal AVD.

Another embodiment of a video signal transmitting apparatus according to the present invention will be explained referring to drawing. Since the digital signal itself has a specific analog amount corresponding to "0" or "1", such a digital signal can regard itself as the analog signal and thereby the digital signal can be transmitted to the video signal regenerating apparatus.

Figure 6:
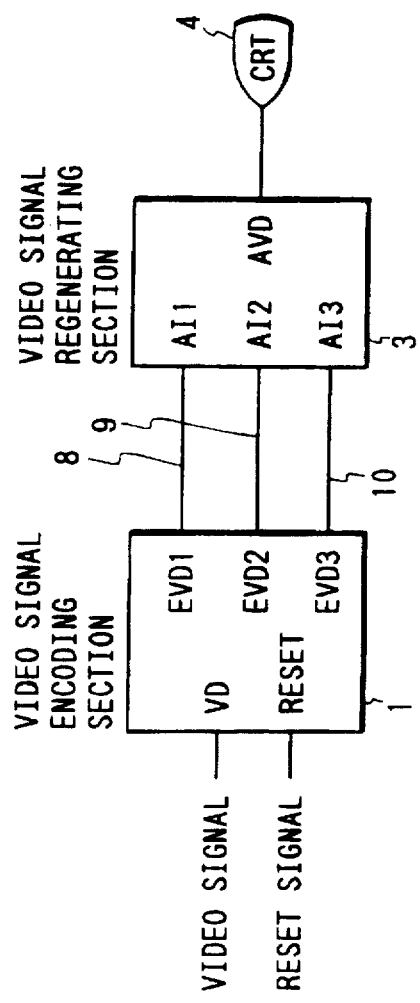
FIG. 6 is a block diagram showing another embodiment of a video signal transmitting apparatus according to the present invention.

In this embodiment of the video signal transmitting apparatus, as shown in FIG. 6, both of the analog converting section 2 and the digital signal transmitting lines 5, 6 and 7, included in the former embodiment shown in FIG. 1, can be omitted. Accordingly, the encoded video signals EVD1, EVD2 and EVD3 in the video signal encoding section 1 are transmitted directly to the video signal regenerating apparatus 3 via the analog signal transmitting lines 8, 9 and 10.

According to the video signal transmitting apparatus in the present invention, the video signal which is outputted in a logic level form is converted to n logic signals. With respect to the converted video signal to n logic signals, in the case wherein the video signal is at level "0", the number of the converted signals in which the logic levels thereof become "1" corresponds to the number "m1", and in the case wherein the video signal is at level "1", the number of the converted signals in which the logic levels thereof become "1" corresponds to the number "m2".

Therefore, each of the converted signals can be transmitted using two analog amounts respectively corresponding to the logic levels, and the video signal can be restored through the addition calculating processing of each of the transmitted signals.

In the present invention, for regenerating the video signal it is unnecessary to provide the digital circuit, accordingly it can easily integrate into the CRT display apparatus constituting the analog circuit. Since it is unnecessary to provide the digital circuit into the CRT display apparatus, also it is unnecessary to provide the power source for the digital circuit. Therefore, it can be implemented more simply, that is it requires less circuit hardware for producing the frequency reduction means.

Further, it can avoid the various problems caused by the mixture mounting of the digital circuits and the analog circuits, namely which would otherwise result in an interface problem between the analog-digital circuits, the induction of the digital circuit with the analog circuit, the unnecessary radiation from the digital circuit, etc.

In the above stated embodiment shown in FIG. 1 according to the present invention, when the video signal is transmitted at a long distance, since the analog transmitting lines 8, 9 and 10 can be included, the transmitting characteristic property and the prevention of unnecessary (undesirable) radiation can be enhanced more effectively in comparison with the case of implementing the apparatus with only the digital transmitting lines 5, 6 and 7.

We claim:

1. In a video signal transmitting apparatus in which a video signal inputted thereto is in a bi-level form, in which said video signal is converted to a plurality of signals and said plurality of converted signals are transmitted to a display apparatus, and in which each one of said plurality of converted signals has a lower frequency than said video signal, the improvement in said video signal transmitting apparatus comprising:

signal transmitting means for transmitting said plurality of converted signals simultaneously, wherein all of said plurality of converted signals use the same and only two, predetermined analog values, said two, predetermined analog values representing all logic levels corresponding to each one of said plurality of converted signals; and regenerating means, coupled to said signal transmitting means, for performing an arithmetic addition operation of the analog values, received simultaneously and corresponding to the plurality of converted signals transmitted from said signal transmitting means, and for restoring said video signal on a basis of the simultaneously received analog values.

2. In a video signal transmitting apparatus in which a video signal inputted thereto is in a bi-level form, in which said video signal is converted to a plurality of signals and said plurality of converted signals are transmitted to a display apparatus, and in which each one of said plurality of converted signals has a lower frequency than said video signal, the improvement in said video signal transmitting apparatus comprising:

video signal converting means for converting said video signal into n signals and including means which converts a first number of said n signals into values representative of a logic level "1" when said video signal is at logic level "0" and converts a different, second number of said n signals into values representative of the logic level "1" when said video signal is at logic level "1";

signal transmitting means for transmitting said n signals simultaneously, wherein all of said n signals use the same and only two, predetermined analog values, said two, predetermined analog values representing all logic levels corresponding to each one of the n converted signals; and regenerating means, coupled to said signal transmitting means, for performing an arithmetic addition operation of the analog values, received simultaneously and corresponding to the transmitted n converted signals, and for restoring said video signal on a basis of the simultaneously received analog values.

3. In a video signal transmitting apparatus in which a video signal is inputted thereto in a bi-level form, in which said video signal is converted to a plurality of signals and said plurality of converted signals are transmitted to a display apparatus, and in which each one of said plurality of converted signals has a lower frequency than said video signal, the improvement in said video signal transmitting apparatus comprising:

video signal converting means for converting said video signal to n signals and including means which converts a first number of said n signals into data bits indicative of display data when said video signal is at logic level "0" and converts a different, second number of signals into data bits indicative of display data when said video signal is at logic level "1";

signal transmitting means for transmitting said n signals simultaneously, wherein all of said n signals use the same and only two, predetermined analog values, said two, predetermined analog values representing all logic levels corresponding to each one of the n converted signals; and regenerating means, coupled to said signal transmitting means, for performing an arithmetic operation of the analog values, received simultaneously and corresponding to the transmitted n converted signals, and for restoring said video signal on a basis of the simultaneously received analog values.

4. A video signal transmitting apparatus according to claim 2, wherein said regenerating means includes a circuit which adds arithmetically analog values transmitted from a plurality of transmitting signal lines and restores said video signal in accordance with an arithmetic addition processing in said circuit.

5. A video signal transmitting apparatus according to claim 3, wherein said regenerating means includes a circuit which adds arithmetically analog values transmitted from a plurality of signal transmitting lines and restores said video signal in accordance with an arithmetic addition processing in said circuit.

6. A video signal transmitting apparatus according to claim 4, wherein said regenerating means is connected to a CRT display apparatus.

7. A video signal transmitting apparatus according to claim 5, wherein said regenerating means is connected to a CRT display apparatus.

8. In a video signal transmitting apparatus in which a video signal inputted thereto is in a bi-level form, in which said video signal is encoded into a plurality of signals by a video signal encoding section and said plurality of encoded signals are transmitted to a display apparatus using a plurality of signal transmitting lines, and in which each one of said plurality of encoded signals has a lower frequency than said video signal, the improvement in said video signal transmitting apparatus comprising:

video signal converting means for converting said video signal into n encoded signals and including means which converts a first number of said n encoded signals into values representative of a logic level "1" when said video signal is at logic level "0" and converts a different, second number of said n encoded signals into values representative of a logic level "1" when said video signal is at logic level "1";

signal transmitting means for transmitting said n encoded signals simultaneously via said plurality of signal transmitting lines, respectively, wherein all of said n encoded signals use the same and only two, predetermined analog values, said two, predetermined analog values representing all logic levels corresponding to each one of said n encoded signals; and regenerating means, coupled to said signal transmitting means, for performing an arithmetic addition operation of the analog values, received simultaneously and corresponding to the n encoded signals transmitted through said plurality of signal transmitting lines, and for restoring said video signal on a basis of the simultaneously received analog values.

9. In a video signal transmitting apparatus in which a video signal inputted thereto is in a bi-level form, in which said video signal is encoded into a plurality of signals by a video signal encoding section and said plurality of encoded signals are transmitted to a display apparatus, and in which each one of said plurality of encoded signals has a lower frequency than said video signal, the improvement in said video signal transmitting apparatus comprising:

video signal converting means for converting said video signal into n encoded signals and including means which converts a first number of said n encoded signals into values representative of a logic level "1" when said video signal is at logic level "0" and converts a different, second number of said n encoded signals into values representative of a logic level "1" when said video signal is at logic level "1";

signal transmitting means for transmitting said n encoded signals simultaneously, wherein all of said n encoded signals use the same and only two, predetermined analog values, said two, predetermined analog values representing all logic levels corresponding to each one of said n encoded signals; and regenerating means, coupled to said signal transmitting means, for performing an arithmetic addition operation of the analog values, received simultaneously and corresponding to the transmitted n encoded signals, and for restoring said video signal on a basis of the simultaneously received analog values.

* * * * *